UNITED STATES PATENT OFFICE.

AGAPIT BRAULT, OF MONTREAL, QUEBEC, ASSIGNOR TO GIDEON BOURDEAU, OF LAPRAINE, CANADA.

IMPROVEMENT IN ARTIFICIAL MARBLE.

Specification forming part of Letters Patent No. 205,346, dated June 25, 1878; application filed March 2, 1878.

*To all whom it may concern:*

Be it known that I, AGAPIT BRAULT, of the city and district of Montreal, Province of Quebec, Dominion of Canada, have invented a new and useful compound called "Artificial Marble," which compound is fully described in the following specification.

This invention relates to that class of compounds used for ornamental purposes, buildings, and other structures; and it consists in a composition for artificial stone, as will be hereinafter more fully set forth, and pointed out in the claim.

To prepare this composition, take ten ounces of sulphur, seven and a half ounces of marble-dust, two ounces and one-fourth of an ounce of ivory-black in powder, and one-sixth of an ounce of American vermilion in powder. First dissolve the sulphur in a vessel at a temperature of 226°; give the same temperature to the marble-dust before mixing it to the sulphur, the two being mixed; take off one ounce and a half of same and place it in another vessel; then add to this last the one-sixth of an ounce of vermilion, so as to form the yellow veins; then add the ivory-black to the sulphur and marble-dust contained in the first vessel, when the whole is dissolved at a temperature of 226°; throw in it the portion contained in the small vessel; then mold it.

To acquire the polish, it is necessary that the composition should be molded in polished molds, to which the above-named temperature should be given.

The composition will not decompose by age, and will stand any climate, and is equally as substantial and as serviceable as marble, and can be applied to the same purposes at far less cost, and insures the same regularity and beauty, and for the same reason is one of the most useful compositions for the purposes hereinbefore set forth.

I claim—

A composition for artificial stone, consisting of sulphur, marble-dust, ivory-black and powdered vermilion, as set forth.

AGAPIT BRAULT.

In presence of—
G. DELAMADELEIN,
ELZEAR BEAUVAIS.